United States Patent
Sutherland

(10) Patent No.: US 6,909,983 B2
(45) Date of Patent: Jun. 21, 2005

(54) CALIBRATION OF AN ANALOGUE PROBE

(75) Inventor: Alexander Tennant Sutherland, Edinburgh (GB)

(73) Assignee: Renishaw PLC, Gloucestershsire (GB)

( * ) Notice: Subject to any disclaimer, the term of this patent is extended or adjusted under 35 U.S.C. 154(b) by 0 days.

(21) Appl. No.: 10/471,403

(22) PCT Filed: Mar. 13, 2002

(86) PCT No.: PCT/GB02/01013

§ 371 (c)(1),
(2), (4) Date: Sep. 11, 2003

(87) PCT Pub. No.: WO02/073128

PCT Pub. Date: Sep. 19, 2002

(65) Prior Publication Data

US 2004/0093179 A1 May 13, 2004

(30) Foreign Application Priority Data

Mar. 14, 2001 (GB) .............................................. 0106245

(51) Int. Cl.$^7$ ................................................. G01B 5/00
(52) U.S. Cl. ........................ 702/104; 702/95; 73/1.81; 33/503; 33/554; 33/556
(58) Field of Search ...................... 702/104, 95; 33/503, 33/551, 553, 554, 556, 502, 644; 73/1.81

(56) References Cited

U.S. PATENT DOCUMENTS

| | | | |
|---|---|---|---|
| 4,523,450 A | * | 6/1985 | Herzog ........................ 73/1.81 |
| 4,945,501 A | | 7/1990 | Bell et al. |
| 5,125,261 A | * | 6/1992 | Powley ........................ 73/1.81 |
| 5,501,096 A | | 3/1996 | Stettner et al. |
| 5,895,442 A | | 4/1999 | Arndt et al. |
| 6,434,846 B1 | * | 8/2002 | McMurtry et al. ............ 33/502 |

FOREIGN PATENT DOCUMENTS

| | | |
|---|---|---|
| GB | 1 551 218 | 8/1979 |
| WO | WO 00/25087 | 5/2000 |

* cited by examiner

Primary Examiner—Michael Nghiem
Assistant Examiner—Hien Vo
(74) Attorney, Agent, or Firm—Oliff & Berridge, PLC

(57) ABSTRACT

A method of calibrating a probe mounted on a machine in which the probe has a probe calibration matrix which relates the probe outputs in three orthogonal axes to the machine's X, Y and Z coordinate system. A datum ball mounted on the machine is bi-directionally scanned by the probe in one or more planes. For each plane, the mean direction of two approximate probe vectors in the plane is rotated about an axis orthogonal to that plane until the apparent material condition from the scan in each direction is the same. This process may be iterative. The mean values of the directions of the probe vectors for each plane are rotated, thus forming a corrected probe calibration matrix. The datum ball is preferably bi-directionally scanned in three orthogonal planes.

9 Claims, 2 Drawing Sheets

CALIBRATION OF AN ANALOGUE PROBE

BACKGROUND OF THE INVENTION

1. Field of the Invention

The present invention relates to a method of calibration for analogue probes. The method has particular reference to the calibration of analogue probes which have a stylus for contacting a workpiece, and which is mounted on a mechanical suspension, for example a spring suspension.

2. Description of the Related Art

Analogue probes of this type are well known and an example of such a probe is described in our UK Patent No. 1,551,218. This patent describes a probe suspension mechanism which comprises three orthogonally arranged pairs of parallel springs connected in series between a fixed point on the probe housing and a movable member to which a workpiece contacting stylus is connected.

During a measuring operation on a workpiece using such a probe, a machine on which the probe is mounted is driven towards the workpiece to bring the stylus into contact with the workpiece surface at various points on the surface. When the stylus contacts the workpiece the stylus will be deflected as the machine continues to move, and measuring transducers within the probe generate outputs representing deflections of the probe stylus along three orthogonal axes. These axes are referred to as the a, b and c axes of the probe.

Ideally it would be arranged that the a, b, and c axes of the probe are aligned with the X, Y and Z coordinate axes of the machine when the probe is mounted on the machine, so that the measured deflections of the probe stylus will take place along the X, Y and Z axes of the machine. However, such alignment is not always possible to achieve.

Also, if there is any mis-alignment between the three probe a, b and c axes, such that they are not orthogonal, then deflection of the stylus, for example, nominally in the a direction can give rise to deflections in the b and c directions also.

Additionally, the scaling factors of the three probe axes will, in general, deviate from their nominal values.

Therefore, it is usual to calibrate the probe and machine system to determine the effects of any such mis-alignments and scaling errors, and thereafter to correct any measurements made on a workpiece for these effects.

One method of performing the calibration which is described in our International Patent Application No. WO00/25087 is to mount a calibration artefact (usually a reference sphere of known diameter) on the machine, and to drive the probe towards the artefact, for example, along one of the machine axes, until an increase in the output of the measuring devices of the probe above a pre-determined threshold level indicates that contact with the surface of the artefact has been made. After stylus contact has been confirmed, a set of machine X, Y, Z and probe a, b, c coordinate data are taken. Machine movement continues until the machine has moved a selected distance beyond the confirmed contact point, and a further set of X, Y, Z, and a, b, c coordinate data are taken.

The changes in the a, b, c outputs of the probe's measuring transducers in the three axes are recorded and correlated with the changes in the readings of the machine's measurement devices along each of the three machine axes. This procedure is repeated for two other orthogonal directions, which may be the other two machine axes, and from the sets of readings a probe transformation matrix can be established which relates the probe outputs in the a, b and c axes to the machine's X, Y and Z coordinate system. This involves solving the nine simultaneous equations relating the a, b, and c axis data to each of the X, Y, and Z axes. This process may be repeated for one or more further deflections but normally only relatively few data points are taken.

Once the transformation matrix has been established the relevant machine axis components of the probe deflections can be obtained by multiplying the relevant probe output by the relevant matrix term.

The key assumption in this calibration is that the machine movement mirrors the movement of the stylus tip relative to the probe. However, this assumption becomes invalid when the stylus slips on the surface of the sphere.

There are two factors which can cause the stylus to slip on the sphere surface;

i) the machine may not go down the commanded direction accurately enough to prevent slippage, ii) the probe force and deflection vectors may not coincide closely enough to prevent slippage.

Although the sensitivities of the probe axes are accurately determined by this method, side slip of the stylus generates false directions for the probe axes.

Furthermore, when scanning with the calibrated probe, tip friction drag causes a significant component of probe displacement in the negative scan direction.

The combination of the false directions of the probe axes mentioned above with tip friction drag causes an error in the apparent material condition of the surface (i.e. in the direction normal to the surface).

SUMMARY OF THE INVENTION

The present invention provides a method of calibrating a probe, said probe being mounted on a machine and having a stylus with a workpiece contacting tip and having a probe calibration matrix which relates the probe outputs in three orthogonal axes to the machine's X, Y and Z coordinate system, comprising the steps of:

bi-directionally scanning a datum ball in at least one plane and for each plane, rotating the mean direction of two approximate probe vectors in the plane about an axis orthogonal to the that plane until the apparent material condition from the scan in each direction is the same;

taking the rotated mean values of the directions of the probe vectors for each plane and thus forming a corrected probe calibration matrix.

Individual probe vectors in each plane may be allowed to vary in magnitude and direction providing the mean vector direction remains unchanged.

BRIEF DESCRIPTION OF THE DRAWINGS

The methods of the invention will now be more particularly described with reference to the accompanying drawings in which.

DETAILED DESCRIPTION OF THE PREFERRED EMBODIMENT(S)

Figure 1:
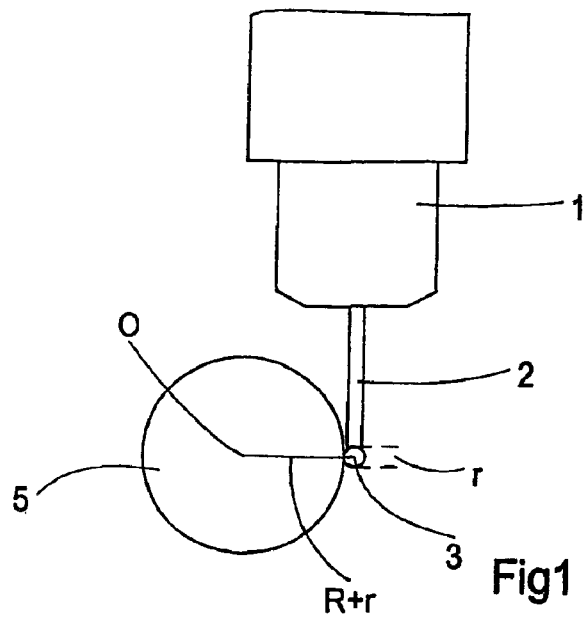
FIG. 1 illustrates a scanning probe with its stylus in contact with a reference artefact.
Figure 2:
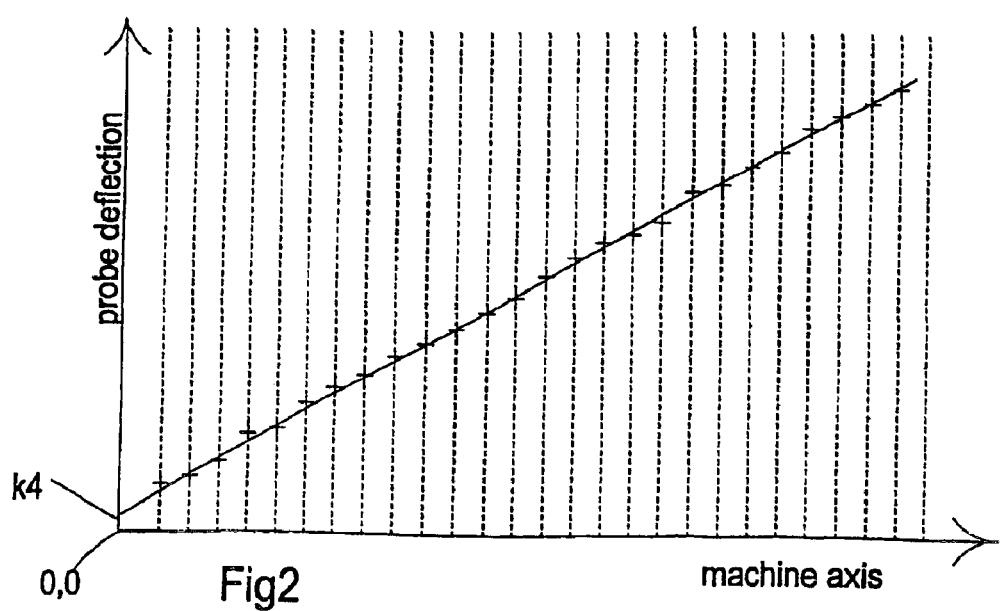
FIG. 2 shows a plot of probe deflections versus machine movement in one of the X Y Z axes of the machine.

Referring now to FIGS. 1 and 2, there is shown an analogue probe 1 mounted on a machine quill (not shown)

and which has a stylus 2 with a stylus ball 3 at its free end. The stylus is shown in contact with a reference sphere of known radius R and having its centre O at position X1, Y1, Z1 in the machine axis coordinates. The stylus ball has a radius r which is to be determined, along with the position of the centre of the sphere and the probe transformation matrix.

As a first step in the calibration method the probe must be "zeroed" in its free condition. This simply involves taking readings from the probe measurement transducers when no contact force is acting on the stylus and setting these to zero in all three axes, or alternatively storing these readings so that they can be subtracted from all subsequent readings.

The next step is to make an estimate of the position of the centre of the sphere, by taking measurements of points at four positions around the surface of the sphere from which the position of the centre can be calculated in known manner, and using a relevant default probe transformation matrix as a starting point. This step is needed because the calibration method requires the sphere to be contacted at least at 9 points, but up to as many as may be required with a reasonable distribution over its surface, taking account of obstructions, and it is important that the machine should be driven so the probe will contact the surface at approximately the right positions on the surface of the sphere. However, it is not important that the position of the centre of the sphere is known accurately at this stage.

The calibration method requires that for each of the plurality of points of the calibration algorithm, the probe stylus is driven by the machine into contact with the sphere in a direction which is nominally normal to the sphere surface. After the stylus ball has contacted the surface of the sphere, the machine continues to drive the probe in the same direction until the deflection of the stylus exceeds the required calibration deflection. The magnitude of this deflection is determined by the deflections which will occur in practice when the probe is being used to measure a workpiece.

Once the required deflection of the stylus has been achieved the machine is stopped and reversed along its approach path, and readings are taken simultaneously at regular intervals, of the outputs of the measuring devices of the machine and of the measuring transducers in the probe, to provide the a, b and c outputs of the probe synchronised with the X, Y and Z coordinates of the machine position. This process continues until the probe stylus leaves the surface and for a small distance thereafter to take account of noise and time lags in the probe outputs.

This data may now be used to calculate the X, Y, and Z axis positions of the machine at zero probe deflection for each of the points on the sphere, for example, by fitting the data for each point to an equation of the form;

$$x = k1.a + k2.b + k3.c + k4$$

and then extrapolating to zero, i.e. x=k4.

Because the reference sphere and the stylus ball are both specified as being accurately spherical, it follows that all of these extrapolated points must be on the surface of a sphere of radius R+r. From the points which have been calculated, the radius R+r and the position of the centre of the sphere can now be calculated more accurately using a standard multi-point sphere fit function, for example the least squares best fit method. Since the radius R of the sphere is known the radius r of the stylus ball can now be determined.

The above-described calibration process is described in WO00/25087. This process provides a probe matrix optimised for one radial deflection of the stylus, and, if desired, further calculations can be carried out for other deflections of the probe within the normal measuring range.

The benefit of this calibration process is that the sole requirement is that the stylus ball remains on the surface of the reference sphere while the data is being gathered at each of the points. It is also important that the acquisition of the measurement data from the measuring devices of the machine giving the X, Y and Z coordinates at each point is adequately synchronised with the data coming from the probe measuring devices which provide the probe axis a, b and c data.

The matrix generated above is only approximate since friction effects may distort direction and magnitude of the probe axes.

Figure 3:
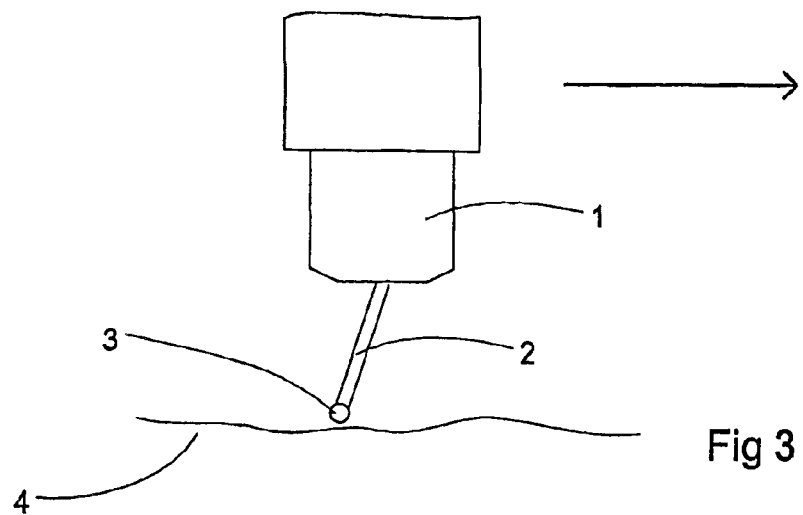
FIG. 3 shows a scanning probe with its stylus lagging due to friction.

When scanning with the calibrated probe frictional drag on the probe tip 3 causes a significant component of probe displacement parallel to the surface 4 in the negative scan direction as seen in FIG. 3.

The combination of the false directions of the probe axes caused by slippage (the coefficient of friction of stylus tips is very low) with tip friction drag causes an error in the apparent material condition of the surface.

This error is readily seen when scanning in opposite directions along a surface. Apparent changes in the material conditions of the surface are detected in the two opposite directions caused by the probe lag due to friction. The invention lies in using these differences to fine tune the vector directions. This is done by rotating the probe matrix to make the apparent friction angles appear nominally the same in each direction. This may be iterative.

In a perfect system without slip, the probe tip should have a displacement which exactly mirrors that of the CMM when the CMM is moved a given distance and direction against a surface. In this perfect system the probe matrix could, for example be:

$$\begin{matrix} 1 & 0 & 0 \\ 0 & 1 & 0 \\ 0 & 0 & 1 \end{matrix}$$

This is using the convention below which will be used subsequently.

$$\begin{matrix} a(X \text{ term}) & b(X \text{ term}) & c(X \text{ term}) \\ a(Y \text{ term}) & b(Y \text{ term}) & c(Y \text{ term}) \\ a(Z \text{ term}) & b(Z \text{ term}) & c(Z \text{ term}) \end{matrix}$$

However, false directions may be acquired for some probe axes during calibration, for example if slippage occurred. Assuming, for illustration, that the slippage was such as to cause the probe a+ vector to appear to be +1° from its true direction in the XZ plane only. A false probe matrix would then be generated, as shown below.

$$\begin{matrix} \cos 1° & 0 & 0 \\ 0 & 1 & 0 \\ \sin 1° & 0 & 1 \end{matrix}$$

In this case the significant error is $\sin 1°$ (i.e. the a(Z term)). Thus when measuring in the Z direction, any probe deflection in the probe "a" direction will cause a measuring error of $a \sin 1°$.

When scanning a surface in ±a directions, friction drag causes the ±a probe deflections in the opposite direction.

Thus in this case the ±asin1° error in Z when scanning over a plane is caused by the probe dragging with a friction angle of 1°.

To determine the true probe axis directions the datum ball is scanned bi-directionally in each of three nominally orthogonal planes and synchronous machine and probe readings are obtained. These planes may be the XY plane, YZ plane and XZ plane.

For each scan the apparent friction angle is determined continuously from the differences between the measured surface normal and the probe deflection direction. Apparent friction angle versus angular position around the ball may be plotted for each scan direction. The errors in probe axis directions cause the mean lines to be asymmetric either side of zero friction angle.

Figures 4A, 4B:
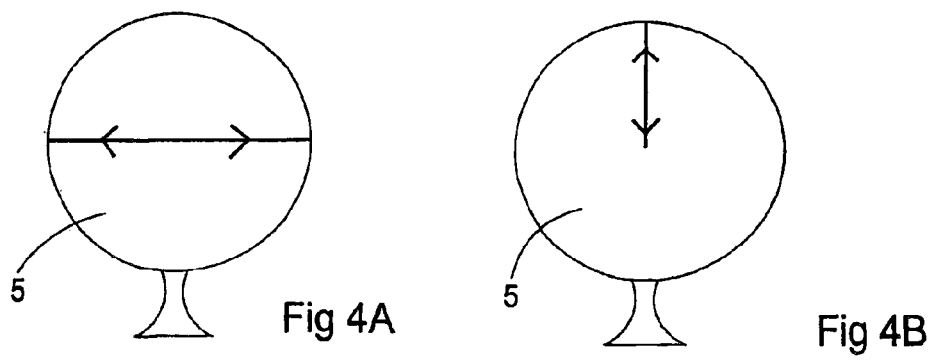
FIGS. 4A–C show the bi-directional scanning of a datum ball in three orthogonal planes.

Firstly the datum ball is scanned in the XY plane in both the clockwise and anti-clockwise directions as shown in FIG. 4A. The mean direction of the two approximate probe vectors in the XY plane (i.e. a and b) is rotated about the Z axis iteratively until the apparent friction angle for either direction of scan is equal.

The datum ball is then scanned in the YZ plane as shown in FIG. 4B. Again the datum ball is scanned in both clockwise and anti-clockwise directions. This time the mean direction of the two approximate probe vectors in YZ plane (i.e. b and c) is rotated about the X axis iteratively until the apparent friction angle for either direction is equal.

Figure 4C:
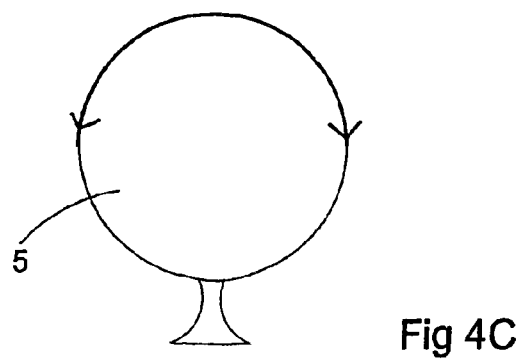

Finally the datum ball is scanned in the XZ plane in both clockwise and anti-clockwise directions as shown in FIG. 4C. In this case the mean direction of the two approximate probe vectors in the XZ plane (i.e. a and c) is rotated about the Y axis iteratively until the apparent friction angle for either direction of scan is equal.

It can be seen that after the three scans described above there are three resulting mean vectors, a/b, b/c and c/a. Without changing any of these mean directions (e.g. by rotating a and b equally and oppositely in the ab plane) individual probe axis vector directions and magnitudes-are varied to minimise the sum of the radial errors squared. This is a standard calibration technique and will not be discussed further.

This method has the advantage that once the six scans of the datum ball have been completed (i.e. two in each plane), the existing data is used to optimise the probe matrix iteratively without any further data being required.

A further benefit is that the number of touch points required for calibration with this method is reduced. Good results may be achieved by combining a 9 point touch initial matrix with the six scan refinement above. However in practice 13 points are preferred as this gives better estimates of the position of the reference ball and the diameter of the probe tip, both of which are required for subsequent measuring tasks.

This method of enhanced probe calibration is also suitable for use in touch trigger measurement.

The invention is not limited to bi-directionally scanning the datum ball in three orthogonal planes. The method may be carried out in a subset of this, for example just one plane or in two-orthogonal planes.

Furthermore, the method may be carried out by bi-directionally scanning the datum ball in planes which are not orthogonal to one another.

What is claimed is:

1. A method of calibrating a probe, said probe being mounted on a machine and having a stylus with a workpiece contacting tip, the probe producing probe outputs which represent deflection of the stylus and having a probe calibration matrix which relates the probe outputs in three orthogonal axes to the machine's X,Y and Z coordinate system, comprising the steps of:
   bi-directionally scanning a datum ball in at least one plane and determining an apparent material condition of the datum ball in each direction of the scan, and for each plane, rotating the mean direction of two approximate probe vectors in the plane about an axis orthogonal to that plane until the apparent material condition from the scan in each direction is the same;
   taking the rotated mean values of the directions of the probe vectors for each plane and thus forming a corrected probe calibration matrix.

2. A method of calibrating a probe according to claim 1 wherein the individual probe vectors in each plane are allowed to vary in magnitude.

3. A method of calibrating a probe according to claim 1 wherein the individual probe vectors in each plane are allowed to vary in direction.

4. A method of calibrating a probe according to claim 1 wherein the one or more planes are substantially orthogonal to each other.

5. A method of calibrating a probe according to claim 1 wherein the one or more planes comprise three planes substantially orthogonal to each other.

6. A method of calibrating a probe according to claim 1 wherein the process of rotating the mean direction of the two approximate probe vectors in the plane about an axis orthogonal to that plane is iterative.

7. A method of calibrating a probe according to claim 1 wherein the probe is an analogue probe.

8. A method of calibrating an analogue probe, said analogue probe mounted on a machine and having a stylus with a workpiece contacting tip and having a probe calibration matrix which relates the probe outputs in three orthogonal axes to the machine's X,Y and Z coordinate system, comprising the step of:
   (a) hi-directionally scanning a datum ball in a first plane and rotating the mean direction of two approximate probe vectors in said first plane about an axis orthogonal to the first plane until the apparent material condition from the scan in each direction is the same;
   (b) bi-directionally scanning said datum ball in a second plane orthogonal to the first plane and rotating the mean direction of two approximate probe vectors in said second plane about an axis orthogonal to the second plane until the apparent material condition from the scan in each direction is the same;
   (c) hi-directionally scanning said datum ball in a third plane orthogonal to the first and second planes and rotating the mean direction of two approximate probe vectors in said third plane about an axis orthogonal to the third plane until the apparent material condition from the scan in each direction is the same;
   (d) taking the rotated mean values of the directions of the probe vectors of steps (a), (b) and (c) and thus forming a corrected probe calibration matrix.

9. A method of calibrating a probe, said probe being mounted on a machine and having a stylus with a workpiece contacting tip, the probe producing probe outputs which represent deflection of the stylus and having a probe calibration matrix which relates the probe outputs in three orthogonal axes to the machine's X, Y and Z coordinate system, comprising the steps of:
   bi-directionally scanning a datum ball in at least one plane and determining the apparent material condition of the datum ball in each direction of the scan, and for each plane, adjusting the vector directions until the apparent material condition from the scan in each direction is the same;
   taking the adjusted values of the probe vectors for each plane and thus forming a corrected probe calibration matrix.

* * * * *